(12) United States Patent
Müller

(10) Patent No.: US 7,337,695 B2
(45) Date of Patent: Mar. 4, 2008

(54) TRANSMISSION CASING

(75) Inventor: Friedrich Müller, Eisingen (DE)

(73) Assignee: Stöber Antriebstechnik GmbH & Co., Pforzheim (DE)

( * ) Notice: Subject to any disclaimer, the term of this patent is extended or adjusted under 35 U.S.C. 154(b) by 9 days.

(21) Appl. No.: 10/708,180

(22) Filed: Feb. 13, 2004

(65) Prior Publication Data

US 2005/0132841 A1    Jun. 23, 2005

(30) Foreign Application Priority Data

Dec. 18, 2003   (DE) .......................... 203 19 855 U

(51) Int. Cl.
   *F16H 57/02*   (2006.01)
(52) U.S. Cl. ..................................... 74/606 R
(58) Field of Classification Search ................ 74/606 R
    See application file for complete search history.

(56) References Cited

U.S. PATENT DOCUMENTS

| | | | | |
|---|---|---|---|---|
| 2,869,384 A | * | 1/1959 | Schmitter | ..................... 74/420 |
| 2,955,487 A | * | 10/1960 | Malley | ........................ 475/341 |
| 3,055,237 A | * | 9/1962 | MAgnuson | ................. 475/296 |
| 3,198,246 A | * | 8/1965 | Brown et al. | ............... 165/253 |
| 4,791,831 A | * | 12/1988 | Behnke et al. | ............ 74/606 R |
| 5,620,311 A | * | 4/1997 | Wetzel | ........................ 417/415 |
| 6,209,409 B1 | * | 4/2001 | Kitahata et al. | ........ 74/388 PS |
| 6,877,750 B2 | * | 4/2005 | Engel | ......................... 277/637 |

FOREIGN PATENT DOCUMENTS

FR    2757261 A1 *  6/1998

\* cited by examiner

*Primary Examiner*—Vicky A. Johnson
(74) *Attorney, Agent, or Firm*—Gudrun E. Huckett

(57) ABSTRACT

A casing has casing parts and fastening elements, wherein the casing parts are connected to one another by the fastening elements. The fastening elements are located inside the casing so that the exterior of the casing is free of projections and recesses. A first one of the casing parts has through openings into which the fastening elements are inserted, and a second one of the casing parts has threaded bores for receiving the fastening elements.

18 Claims, 1 Drawing Sheet

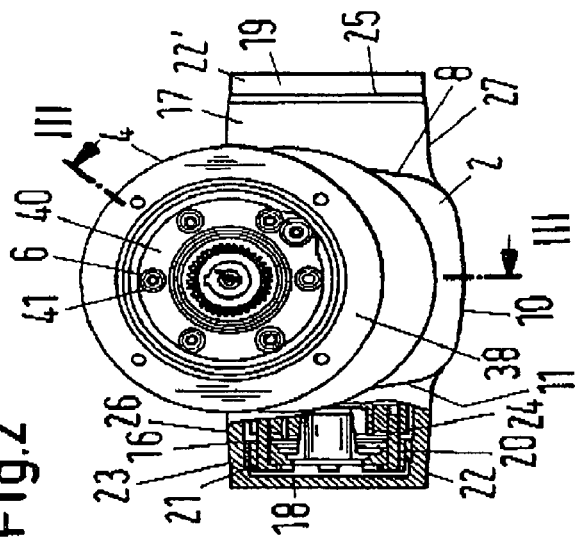
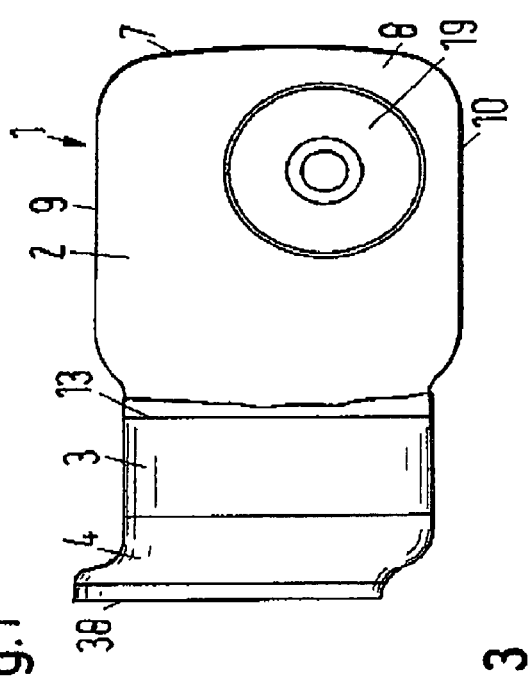
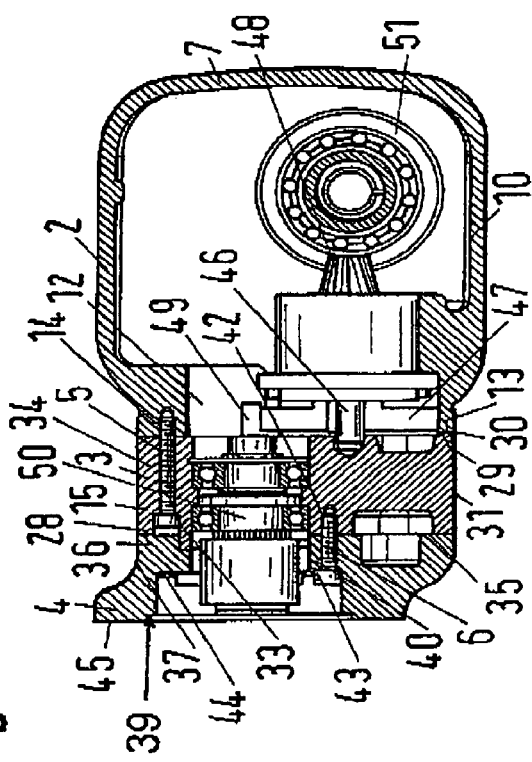

TRANSMISSION CASING

BACKGROUND OF INVENTION

1. Field of the Invention

The invention relates to a casing, in particular, a transmission casing comprising at least two casing parts that are connected to one another by fastening elements, preferably screws.

2. Description of the Related Art

Transmission casings are knowing which are mounted by a flange mount on a motor casing. The transmission casing itself is comprised of two or three casing parts that are connected detachably to one another by means of screws. For receiving the screws, the casing parts are provided with eyes, recesses and the like. The use of such transmission casings in critical areas, for example, in the food industry and food processing industry, is problematic. On the projecting or recessed parts of a transmission casing, dirt particles, germs and the like can deposit; they can be removed only with difficulty or cannot be removed at all.

SUMMARY OF INVENTION

It is an object of the present invention to configure the transmission casing of the aforementioned kind such that it is suitable for use in critical areas, in particular, in the food industry and food processing industry.

In accordance with the present invention, this is achieved in that the fastening elements are located within the casing.

In the casing according to the invention, the fastening elements are no longer located on the exterior of the casing but are hidden or concealed within the casing. Within the casing, it is possible to provide projecting eyes, recesses and the like for receiving the fastening elements. Since the receiving means are located within the casing, they do not impair the use of the casing in critical areas. The exterior of the casing can be free of projections, recesses and the like because of the configuration proposed by the invention. Therefore, dirt particles, germs and the like will not deposit, or deposit only with difficultly, on such casing. Possibly adhering contaminants can be removed easily. The casing according to the invention is suitable excellently for use in the food and food processing industry.

BRIEF DESCRIPTION OF DRAWINGS

FIG. 1 is a side view of a transmission according to the invention.

FIG. 2 is an end view, partially in section, of the transmission according to FIG. 1.

FIG. 3 is a section along the line III-III of FIG. 2.

DETAILED DESCRIPTION

The transmission is used advantageously in the food industry and comprises a casing 1 that, in spite of being comprised of several parts, is configured such that it has no edges and/or corners where dirt, germs and the like can collect, but cannot be removed easily. In the casing 1 of the illustrated embodiment, a spur wheel bevel gear transmission is arranged. This transmission is illustrated only as an example. The casing 1 may contain any other suitable gear or transmission.

The casing of the illustrated embodiment is comprised of three casing parts 2 through 4 that adjoin one another without forming a gap and are held together by fastening elements in the form of screws 5, 6 (FIG. 3) that are arranged hidden or concealed within the casing 1.

The casing part 2 has a back wall 7 that, in the illustrated embodiment, has a rectangular contour and passes with a continuous curvature into the sidewalls 8 through 11. The sidewalls 8 through 11 are formed as monolithic parts of the back wall 7 and delimit an opening 12. The opening 12 can have a square or a round contour. The open end face 13 of the casing part 2 is plane and has distributed about its circumference threaded blind bores 14 into which the screws 5 are threaded with which the casing part 3 is connected to the casing part 2. In the area where the threaded bores 14 are provided, the opening 12 of the casing part 2 is widened so that the casing part 2 has satisfactory strength within the screw area. Depending on the size of the opening 12, three or more threaded bores 14 are distributed about the circumference.

Bushing-shaped casing members 16, 17 adjoin the opposed sidewalls 8, 11, respectively. They are formed as a monolithic part of the sidewalls 8, 11. The casing members 16, 17 are positioned at the same level and have a common axis. The parts of the transmission are arranged in these casing members 16, 17 that have an outer diameter that tapers in the direction toward their free end. However, the casing members 16, 17 can also be parts that are separate from the sidewalls 8, 11 and are connected without gap to the sidewalls 8, 11 of the casing part 2.

Onto the free ends of the casing members 16, 17, a closure member 18, 19 is placed, respectively. The closure member 18, 19 has the shape of a lid and can be screwed, for example, to the free end face of the casing members 16, 17. For this purpose, the casing members 16, 17 have an inner thread 20 at their free end into which the lids 18, 19 are threaded with an outer threaded part 21 that is cylindrical. At the transition from the outer threaded part 21 into the peripheral surface 22 of the lids 18, 19, a plane shoulder surface 23 is formed that is positioned in a radial plane. The shoulder surface 23 of the lids 18, 19 rests areally on the plane annular end face 24, 25 of the casing members 16, 17, respectively. The outer diameter of the peripheral surfaces 22, 22' of the lids 18, 19 matches the outer diameter of the casing members 16, 17 at their end faces 24, 25. In this way, no step is formed at the transition from the peripheral surface 22, 22' of the lids 18, 19 into the peripheral surfaces 26, 27 of the casing members 16, 17. Instead, the transition is continuous. In this way, at the parting line between the casing members 16, 17 and the lids 18, 19 no dirt, germs etc. can collect. Moreover, this transition area can be cleaned optimally.

The lids 18, 19 can be connected to the casing members 16, 17 also by means of a bayonet lock. It is moreover possible to connect the lids 18, 19 to the casing members 16, 17 by means of slight press fit. In both cases, the lids 18, 19, as described above, adjoin the casing members 16, 17 without a gap.

The casing part 3 is essentially annular and has substantially two plane end faces 28, 29 that are positioned in a radial plane of the casing 1, respectively. In the illustrated embodiment, the two end faces 28, 29 of the casing part 3 are parallel to one another. With interposition of at least one sealing ring 30, the casing part 3 is pressed with its end face 29 by means of the screws 5 against the end face 13 of the casing part 2. The sealing ring 30 is positioned at a spacing from the cylindrical peripheral surface 31 of the casing part 3. In this way, the parting line between the two casing parts 2, 3 is closed within the outer peripheral surface 31. The casing part 3 has at least in the area of its end face 29 the same outer diameter as the casing part 2 in the area of its end face 13. In this way, in this connecting area between the two casing parts 2, 3 there is no step or projection. Instead, a continuous transition from the casing part 2 into the casing part 3 is achieved. In this way, this critical area of the transmission casing can be cleaned properly.

The peripheral wall 15 of the casing part 3 is axially penetrated by the screws 5. The heads of the screws 5 are recessed within recesses 33 in the end face 28 of the casing part 3. The peripheral wall 15 is provided with through bores 34 into which the screws 5 are inserted. The through bores 34 open into the recesses 33. In the area of the through bores 34 the peripheral wall 15 of the casing part 3 can be reinforced (thicker) so that in this area a sufficient stiffness or strength is provided.

A plane end face 35 of the coupling part 4 that is positioned within a radial plane of the transmission casing rests against the end face 28 of the casing part 3 with interposition of a sealing ring 36. In the area of the end face 35, the outer diameter of the peripheral wall 37 matches the outer diameter of the peripheral wall 31 of the casing part 3. In this way, no edge or step is formed in this transition area from the casing part 3 to the casing part 4. Instead, the transition is continuous. The casing part 4 has at its free end an annular plane connecting surface 38 with which the transmission casing 1 can be flanged to a motor or the like, as is known in the art. In the connecting surface 38 an annular groove 39 is advantageously provided for receiving a sealing ring with which the sealing action of the transmission casing relative to the motor casing is realized as is known in the art.

The casing part 4 has at a spacing from its free end an inner ring 40 that, as illustrated in FIG. 2, has about its circumference the same radial width and is provided with through openings 41 into which the screws 6 are inserted. The through openings 41 are distributed uniformly in the circumferential direction of the ring 40. The screws 6 are threaded into threaded bores 42 that are provided at the end face 28 of the casing part 3. The threaded bores 42 are positioned in an area between the recesses 33 in the end face 28. The screws 6 are positioned with their heads 43 on the end face 44 of the ring 40 (FIG. 3). Since the end face 44 of the ring 40 is axially recessed relative to the free end face 45 of the casing part 4 in the axial direction, the screws 6 are positioned entirely within the casing part 4.

The screws 5, 6 with which the casing parts 2 through 4 are connected to one another are arranged hidden or concealed within the transmission casing 1 so that the exterior of the transmission casing 1 has no screw heads, recesses for receiving the screw heads, projections or steps at the parting lines of the casing parts 2 through 4 etc. Even though the transmission casing 1 is comprised of three casing parts 2 through 4, it has a smooth exterior that can be kept clean easily and reliably. As a result of the smooth exterior of the transmission casing 1, no dirt particles, germs etc. can deposit thereon. Accordingly, the transmission casing 1 with the integrated transmission can be used advantageously in the food or food processing industry where very high standards in regard to the design of the casing parts with respect to cleanliness, sterile conditions, absence of germs, etc. are to be met.

In the transmission casing 1, a spur wheel bevel gear system is arranged as an example of a transmission. It has a shaft 46 supported in the casing part 2. A spur wheel 47 and a bevel gear 48 are fixedly connected to the shaft 46. The spur wheel 47 is arranged within the opening 12 and meshes with a pinion 49 that is a part of a transmission shaft 50 that is rotatably supported in the central casing part 3 and extends into the casing part 4. A motor shaft can be connected to the gear shaft 50.

The bevel gear 48 meshes with a crown gear 51 that is supported rotatably in the casing member 16.

This two-stage spur wheel bevel gear transmission is illustrated only as an example. Instead of this transmission, depending on the requirements, very different transmissions can be arranged within the transmission casing 1.

The transmission casing 1 is connected with the end face 45 of the casing part 4 to a motor casing whose motor shaft is fixedly connected to the gear shaft 50. For connecting the transmission casing 1 to the motor casing tie bolts are used that are not accessible from the exterior.

The transmission casing 1 is covered after completion of assembly with a protective layer, for example, a coat of paint. By means of this protective layer, the parting lines between the individual casing parts 2 through 4 as well as between the casing members 16, 17 and the lids 18, 19 are covered or sealed so that the entire transmission casing 1 has a continuous smooth exterior surface. The protective layer is comprised of a material which is innocuous with regard to the field of application of the transmission casing.

The transmission casing 1 of the illustrated embodiment is of a three-part configuration. However, the transmission casing can be comprised of two parts or of more parts than three. For example, the casing parts 2, 3 or the casing parts 3, 4 are formed as a unitary or monolithic part in case of a two-part casing configuration.

In the disclosed embodiment, the three casing parts 2 through 4 have a circular contour, respectively. Of course, the casing parts 2 through 4 can have any other suitable contour. It is important that at the transition from one casing part to another casing part no step is present so that the transmission casing 1 overall has a continuous contour free of projections or steps. The transmission casing 1, independent of its outer contour, is designed such that for cleaning the exterior of the casing the employed cleaning medium can flow off or drain on all sides such that no residue of the medium remains on the casing.

While specific embodiments of the invention have been shown and described in detail to illustrate the inventive principles, it will be understood that the invention may be embodied otherwise without departing from such principles.

What is claimed is:

1. A casing comprising casing parts and fastening elements, wherein the casing parts are connected to one another by the fastening elements that are located inside and concealed within the casing and inaccessible from the exterior of the casing when the casing is flanged to a motor casing, wherein the fastening elements do not project to the exterior of the casing parts and the exterior of the casing has a continuous contour that is free of edges, corners, projections, recesses, and steps caused by the fastening elements or by recesses for receiving the fastening elements so that dirt particles and germs are prevented from depositing on the exterior of the casing;

wherein a first one of the casing parts has through openings for receiving the fastening elements;

wherein the first casing part has an end face provided with recesses, wherein the through openings open into the recesses.

2. The casing according to claim 1, wherein the casing is a transmission casing.

3. A casing comprising casing parts and fastening elements, wherein the casing parts are connected to one another by the fastening elements that are located inside and concealed within the casing and inaccessible from the exterior of the casing when the casing is flanged to a motor casing, wherein the fastening elements do not project to the exterior of the casing parts and the exterior of the casing has a continuous contour that is free of edges, corners, projections, recesses, and steps caused by the fastening elements or by recesses for receiving the fastening elements so that dirt particles and germs are prevented from depositing on the exterior of the casing;

wherein a first one of the casing parts has through openings for receiving the fastening elements;

wherein the first casing part has an end face and wherein the through openings of the first casing part are positioned recessed relative to the end face.

4. The casing according to claim 3, wherein a second one of the casing parts has threaded bores for receiving the fastening elements.

5. The casing according to claim 4, wherein the threaded bores are provided in an end face of the second casing part.

6. The casing according to claim 4, wherein at least one of the first and second casing parts has an inner side that is thicker in the area of the threaded bores or through openings than in adjoining areas.

7. The casing according to claim 3, wherein the first casing part has an inner wall and an annular surface positioned in a radial plane of the first casing part and adjoining the inner wall of the first casing part.

8. The casing according to claim 3, wherein the casing parts each have plane end faces and the plane end faces of the casing parts that adjoin one another rest against one another.

9. The casing according to claim 8, wherein the casing parts at least in the area of the end faces have identical contours such that no step is formed at a transition between the casing parts that adjoin one another.

10. The casing according to claim 8, further comprising a protective layer covering a parting line between the casing parts that adjoin one another.

11. The casing according to claim 10, wherein the protective layer is a coat of paint.

12. The casing according to claim 3, wherein the casing is a transmission casing.

13. A casing comprising casing parts and fastening elements, wherein the casing parts are connected to one another by the fastening elements that are located inside and concealed within the casing and inaccessible from the exterior of the casing when the casing is flanged to a motor casing, wherein the fastening elements do not project to the exterior of the casing parts and the exterior of the casing has a continuous contour that is free of edges, corners, projections, recesses, and steps caused by the fastening elements or by recesses for receiving the fastening elements so that dirt particles and germs are prevented from depositing on the exterior of the casing;

wherein a first one of the casing parts has at least one casing member projecting laterally from the first casing part;

wherein the at least one casing member has an end face that is closed off by a lid;

wherein the lid has a shoulder surface resting areally on an end face of the at least one casing member.

14. The casing according to claim 13, wherein the casing part and the at least one casing member are formed as a monolithic part.

15. The casing according to claim 13, wherein the lid is screwed into the at least one casing member.

16. The casing according to claim 13, wherein the casing is a transmission casing.

17. A casing comprising casing parts and fastening elements, wherein the casing parts are connected to one another by the fastening elements that are located inside and concealed within the casing and inaccessible from the exterior of the casing when the casing is flanged to a motor casing, wherein the fastening elements do not project to the exterior of the casing parts and the exterior of the casing has a continuous contour that is free of edges, corners, projections, recesses, and steps caused by the fastening elements or by recesses for receiving the fastening elements so that dirt particles and germs are prevented from depositing on the exterior of the casing;

wherein the fastening elements comprise first and second fastening elements, wherein a first one of the casing parts has through openings for inserting the first fastening elements, wherein a second one of the casing parts has threaded bores into which the first fastening elements are threaded and has through openings for inserting the second fastening elements, wherein a third one of the casing parts has threaded bores into which the second fastening elements are threaded.

18. The casing according to claim 17, wherein the casing is a transmission casing.

* * * * *